Patented Dec. 6, 1938

2,139,522

UNITED STATES PATENT OFFICE 2,139,522

WELDING FLUXES

Thomas C. R. Shepherd, Hale Barns, England, assignor to General Electric Company, a corporation of New York No Drawing. Application September 1, 1937, Serial No. 162,058. In Great Britain September 17, 1936

7 Claims. (Cl. 219—8)

My invention relates to welding fluxes and more particularly to fluxes for use in metallic arc welding.

In metallic arc welding, an arc is maintained between the work to be welded and a rod or strip of metal usually referred to as an electrode. During welding the electrode is fused or vaporized or both and the metal thereof deposited upon and united with the work as the electrode is fed toward the work to maintain the arc.

The facility with which the welding arc may be maintained and the quality of the weld metal deposited by such a process depends to a large extent upon the influence of certain elements or compounds associated with the electrode usually in the form of a coating. Electrodes so coated are commonly referred to as flux coated electrodes.

It is an object of my invention to provide an improved welding flux that is especially adapted for use in arc welding copper-nickel alloys.

It is a further object of my invention to provide an electrode of copper-nickel alloy with a flux coating particularly suited thereto.

According to my invention, the improved arc welding flux comprises a substance which when heated produces a shielding atmosphere admixed with a deoxidizing agent consisting of an alloy of magnesium and nickel preferably one obtained commercially in the proportions of about 10 per cent magnesium to about 90 per cent nickel. As a substance which produces a shielding atmosphere which is neutral in character, graphite may conveniently be employed, this substance giving rise to an atmosphere of carbon dioxide in the presence of the welding arc.

Advantageously, the flux may include one or more additional deoxiding agents such as for example, an alloy of nickel and silicon obtained commercially in the proportions of about 35 per cent nickel to about 65 per cent silicon and a ferro-titanium alloy of about 45 per cent titanium and 55 per cent iron.

Good results have been obtained with fluxes of the above considered materials having the following composition, the proportions being by weight:

| | Per cent |
|---|---|
| Graphite | 40 to 70 |
| Magnesium-nickel | 5 to 20 |
| Nickel-silicon | 5 to 15 |
| Ferro-titanium | 5 to 15 |

As an example of a particular flux composition within the range of proportions above specified, the following has been found to be eminently satisfactory:

| | Per cent |
|---|---|
| Graphite | 65 |
| Magnesium-nickel | 12 |
| Nickel-silicon | 11 |
| Ferro-titanium | 12 |

Other carbonaceous materials, such as paper pulp, wood floor, various grades of cellulose, and the like may be substituted, in proper proportion, for the graphite above specified without departing from my invention. Alloys of magnesium, silicon, and titanium with nickel and iron other than those specified above, may also be employed in order to obtain the desired relative proportions of magnesium, silicon, and titanium in the flux mixture. It is to be noted that in the composition specified, magnesium, silicon, and titanium are present in the respective relative proportions: .50 to 2.00 per cent; 3.25 to 9.75 per cent; and 2.75 to 8.25 per cent. The above flux composition may be rendered suitable for application as an adherent coating to electrodes by the addition of sodium silicate, shellac, starch, gum arabic and the like.

When the above flux is employed for coating welding electrodes, the welding wire or rod is preferably provided with a wrapping of white asbestos wound on the core conveniently in the form of a spiral of about ¼ inch pitch, the flux being applied to the wound core conveniently by a process of extrusion. Instead of using asbestos yarn, the asbestos may be added in the form of powder or fiber to the other constituents of the flux.

The ratio by weight of flux to electrode metal is not considered to be critical and is generally within a range of from 7 to 30 per cent. With an electrode core of about $\frac{1}{16}$ inch diameter, a ratio for the weight of flux to the weight of electrode metal of about 15 per cent has been found to be satisfactory.

As has been pointed out above, fluxes in accordance with my invention are particularly suited for welding electrodes composed of copper-nickel alloy. The most commonly employed copper-nickel alloy is Monel metal which contains about 28 per cent copper, 67 per cent nickel, and about 5 per cent iron and manganese. Another copper-nickel alloy which has been proposed as an electrode material contains, as its principal constituents, copper 53 per cent and nickel 44 per cent.

Copper-nickel alloy electrodes, and particularly Monel metal electrodes, are commonly employed for filling voids in iron castings. When a flux material in accordance with my invention is intended to be used in connection with Monel metal electrodes employed for this purpose, it is advantageous to include in the flux composition one or more of the substances cryolite, clay and ilmenite. As an example the improved flux for use in this connection may have, in addition to the constituents previously enumerated and in relative proportions within the limits stated, 5 to 15 per cent of one or more of the said minerals cryolite, clay, and ilmenite. These substances are essentially slag-forming materials as is the asbestos above specified.

For filling voids in iron castings, a flux of the following composition is found to be very suitable:

|  | Per cent |
|---|---|
| Graphite | 39 |
| Magnesium-nickel | 12 |
| Nickel-silicon | 8 |
| Ferro-titanium | 12 |
| Cryolite | 9 |
| Clay | 10 |
| Ilmenite | 10 |

Constituents other than those specified above may appear in a flux manufactured in accordance with my invention without departing therefrom. Furthermore, my invention is not limited in its application to the welding with or on copper-nickel alloys since it is obviously suited for use in welding with or on metallic nickelous substances of various compositions.

What I claim as new and desire to secure by Letters Patent of the United States is:

1. A flux for use in arc welding including 5–20% by weight of an alloy of magnesium associated with nickel and a carbonaceous substance which in the presence of the welding arc produces a shielding atmosphere, said alloy having a composition of about 10 per cent magnesium and about 90 per cent nickel.

2. A flux for use in arc welding containing in the relative proportions by weight specified the following ingredients: a carbonaceous substance which in the presence of a welding arc produces a shielding atmosphere, 40 to 70 per cent; magnesium, .50 to 2.00 per cent; silicon, 3.25 to 9.75 per cent; and titanium 2.75 to 8.25 per cent, said magnesium, silicon, and titanium ingredients being present in the form of alloys with nickel and iron.

3. A flux for use in arc welding including the following constituents in the relative proportions by weight specified:

|  | Per cent |
|---|---|
| Graphite | 40 to 70 |
| Magnesium-nickel alloy | 5 to 20 |
| Nickel-silicon alloy | 5 to 15 |
| Ferro-titanium alloy | 5 to 15 | the composition of said alloys being substantially as follows: Magnesium-nickel alloy, magnesium 10%, nickel 90%; nickel-silicon alloy, nickel 35%, silicon 65%; and ferro-titanium alloy, iron 55%, titanium 45%.

4. A flux for use in arc welding including the following constituents in the relative proportions by weight specified:

|  | Per cent |
|---|---|
| Graphite | 65 |
| Magnesium-nickel alloy | 12 |
| Nickel-silicon alloy | 11 |
| Ferro-titanium alloy | 12 | the composition of said alloys being substantially as follows: Magnesium-nickel alloy, magnesium 10%, nickel 90%; nickel-silicon alloy, nickel 35%, silicon 65%; and ferro-titanium alloy, iron 55%, titanium 45%.

5. A flux for use in arc welding including the following constituents in the relative proportions by weight specified:

|  | Per cent |
|---|---|
| Graphite | 40 to 70 |
| Magnesium-nickel alloy | 5 to 20 |
| Nickel-silicon alloy | 5 to 15 |
| Ferro-titanium alloy | 5 to 15 | in combination with one or more of the minerals cryolite, clay and ilmenite, each of which constitutes about 5 to 15 per cent of the flux, the composition of said alloys being substantially as follows: Magnesium-nickel alloy, magnesium 10%, nickel 90%; nickel-silicon alloy, nickel 35%, silicon 65%; and ferro-titanium alloy, iron 55%, titanium 45%.

6. A flux for use in arc welding including the following constituents in the relative proportions by weight specified:

|  | Per cent |
|---|---|
| Graphite | 39 |
| Magnesium-nickel alloy | 12 |
| Nickel-silicon alloy | 8 |
| Ferro-titanium alloy | 12 |
| Cryolite | 9 |
| Clay | 10 |
| Ilmenite | 10 | the composition of said alloys being substantially as follows: Magnesium-nickel alloy, magnesium 10%, nickel 90%; nickel-silicon alloy, nickel 35%, silicon 65%; and ferro-titanium alloy, iron 55%, titanium 45%.

7. An electrode of copper-nickel alloy provided with a flux including the following constituents in the relative proportions by weight specified:

|  | Per cent |
|---|---|
| Graphite | 39 |
| Magnesium-nickel alloy | 12 |
| Nickel-silicon alloy | 8 |
| Ferro-titanium alloy | 12 |
| Cryolite | 9 |
| Clay | 10 |
| Ilmenite | 10 | the composition of said alloys being substantially as follows: Magnesium-nickel alloy, magnesium 10%, nickel 90%; nickel-silicon alloy, nickel 35%, silicon 65%; and ferro-titanium alloy, iron 55%, titanium 45%.

THOMAS C. R. SHEPHERD.